United States Patent [19]

Cooke

[11] 4,275,769
[45] Jun. 30, 1981

[54] FIREGUARD FOR HOSE ASSEMBLY

[75] Inventor: Horise M. Cooke, Weatherford, Tex.

[73] Assignee: Stratoflex, Inc., Fort Worth, Tex.

[21] Appl. No.: 93,140

[22] Filed: Nov. 9, 1979

Related U.S. Application Data

[63] Continuation-in-part of Ser. No. 80,567, Oct. 1, 1979, abandoned.

[51] Int. Cl.³ .............................................. F16L 35/00
[52] U.S. Cl. .................................... 138/109; 138/125; 138/126; 138/127; 138/137; 138/138; 138/178; 138/110; 285/149; 428/921; 252/602; 174/110 S; 285/149;256
[58] Field of Search ............... 138/124, 125, 126, 127, 138/137, 140, 141, 143, 109, 110, 149, 177, 178; 428/36, 920, 921; 174/110 S; 252/8.1; 277/26

[56] References Cited

U.S. PATENT DOCUMENTS

| 2,920,910 | 1/1960 | Schnabel | 285/149 |
| 3,148,898 | 9/1964 | Somers | 285/149 |
| 3,251,612 | 5/1966 | Webbe | 285/256 X |
| 3,566,009 | 2/1971 | Lamond et al. | 174/110 S X |
| 3,687,169 | 8/1972 | Reynard | 138/134 |
| 3,913,625 | 10/1975 | Gazda et al. | 138/127 X |
| 4,190,088 | 2/1980 | Lalikos et al. | 138/178 |

Primary Examiner—James E. Bryant, III
Attorney, Agent, or Firm—Merriam, Marshall & Bicknell

[57] ABSTRACT

This disclosure relates to a fireguard for protecting a hose or an assembly of a hose and fittings. The fireguard includes a layer or tube of a silicone compound which is positioned around the hose, and a metal shroud or sleeve which encloses the layer of silicone compound. The silicone compound and the shroud protect the hose at normal temperatures and for a short length of time at a high temperature. In the event the high temperature persists for a length of time, the silicone compound decomposes to a layer of silica ash, which is held in place between the shroud and the hose, and the ash forms an excellent heat insulation for an extended time. The shroud is preferably flexible so that the hose may be bent, and the fireguard preferably also includes another layer of the silicone compound and a collar around each hose fitting.

5 Claims, 3 Drawing Figures

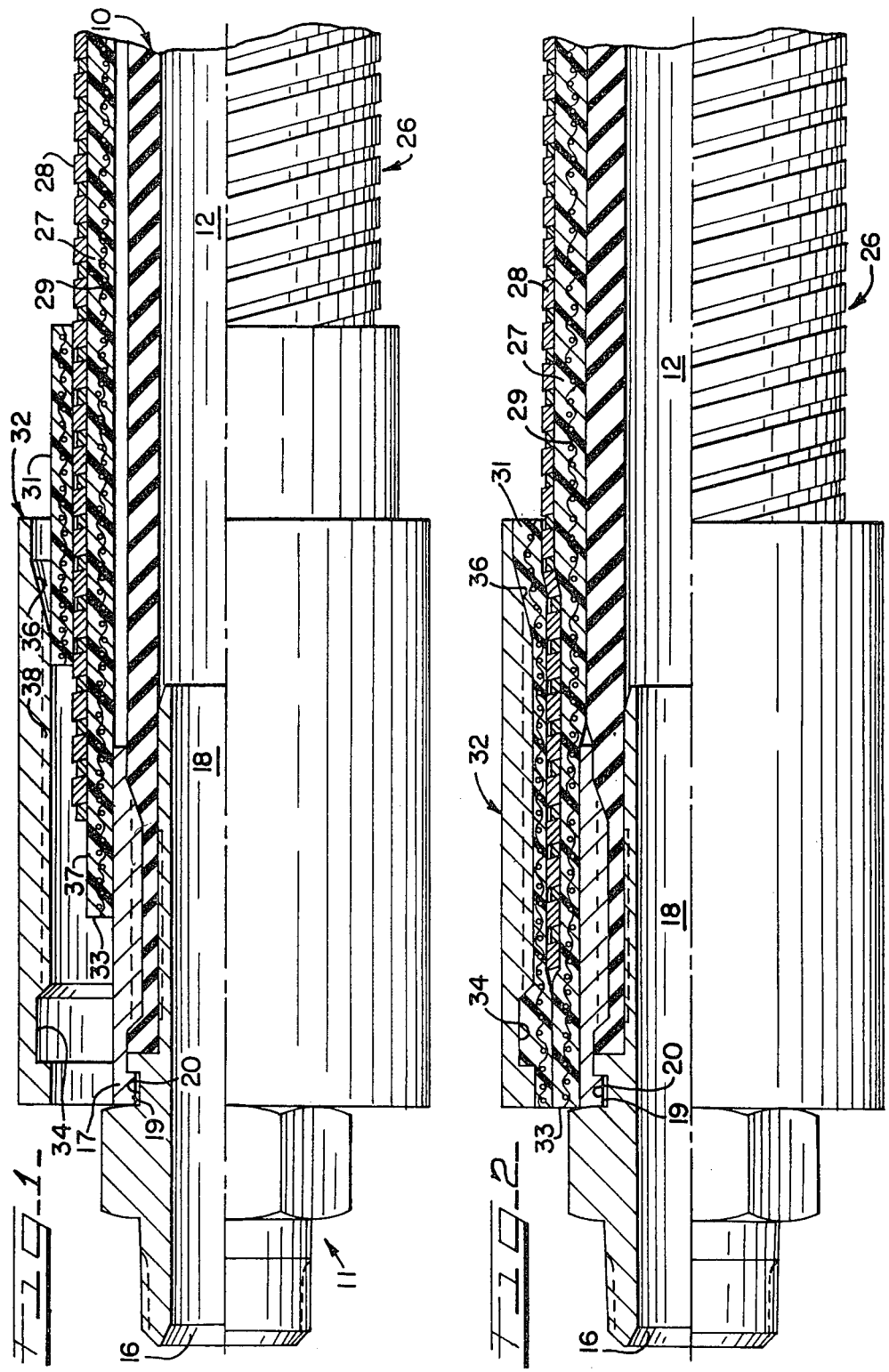

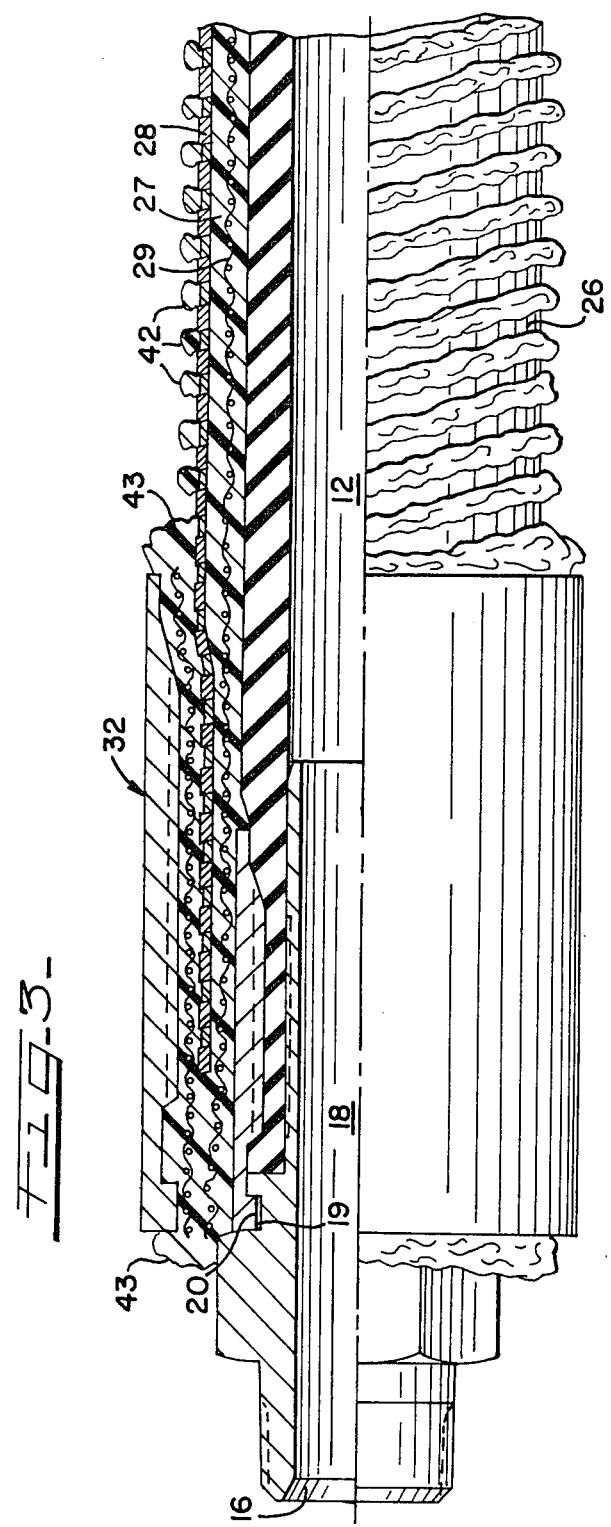

FIREGUARD FOR HOSE ASSEMBLY

This application is a continuation in-part of application Ser. No. 080,567 filed Oct. 1, 1979 now abandoned.

Hydraulic and pneumatic hose assemblies are well known and have been in use for many years. A typical assembly of this character includes a length of hose and a connector or fitting at each end for coupling the hose to other apparatus. The hose includes a tube or lining that is usually surrounded by one or more layers of reinforcement. The tube is usually made of rubber, a synthetic rubber compound, or a plastic material. When provided with a reinforcement, such an assembly is capable of sustaining relatively high pressures for long periods of time.

There are many applications for such an assembly wherein a loss of pressure can have serious consequences. For example, blow-out preventer hose used in a drilling rig and hose assemblies used in aircraft must be able to hold pressure in order to maintain the control functions. There is, of course, in such applications a danger of fire, and there have been instances where hose assemblies have failed due to the high temperature of the fire. The heat destroys or weakens the tube of the hose and causes it to lose pressure, or the connection between the hose and a fitting may fail.

Fireguards for such hose have been provided in the past, but they have not proven to be sufficiently effective. For example, a fireguard consisting of a layer of a silicone rubber compound is known in the prior art, and such a guard will protect a hose at relatively low temperatures. It may also protect a hose at a higher temperature, but only for a very short period of time. There are no prior art fireguards capable of protecting a hose assembly of the character described, for an extended period of time and at very high temperatures.

It is a general object of the present invention to provide a novel and improved fireguard which overcomes the deficiencies of the prior art fireguards.

A fireguard in accordance with the present invention includes a layer of a silicone compound which is sized to be mounted over a hose and fitting assembly, and a shroud or cover which encloses the layer of the silicone compound. The shroud is made of metal and it is preferably flexible so that the hose assembly may be bent in spite of the presence of the fireguard. In the event the hose assembly is subjected to a high temperature, as during a fire, the silicone compound insulates the hose from the heat during the initial period of the high temperature. If the high temperature condition continues, the silicone compound decomposes to a layer of silica ash around the hose assembly. The ash is held in place and prevented from crumbling and falling off the hose by the shroud that surrounds it, and the ash forms a layer of heat insulation which is at least as effective as the layer of the silicone compound, and the ash continues to protect the hose assembly for an extended period of time.

The fireguard preferably also includes a layer of the silicone compound and an outer collar, which are mounted around at least part of each fitting.

The foregoing and other objects and advantages of the present invention will be better understood from the following detailed description taken in conjunction with the accompanying figures of the drawings, wherein:

FIG. 1 shows a fireguard during assembly with a hose and fitting;

FIG. 2 is similar to FIG. 1 but shows the completed assembly; and

FIG. 3 shows the condition of the fireguard after exposure to high heat.

The apparatus illustrated in FIG. 1 includes an assembly including a length of hose 10 and a fitting 11 attached to one end of the hose 10. The other end (not shown) of the hose 10 may have a fitting similar to the fitting 11 attached thereto. The hose 10 includes a tube or liner 12, which may have a reinforcing layer (not illustrated) embedded in it or surrounding it. The liner 12 may consist of a rubber, synthetic rubber, plastic or teflon material, for example, and if a reinforcing layer is provided it usually consists of one or more layers of woven or braided wire or fabric.

The fitting 11 may be any conventional type, and in the present example it includes a tubular nipple 16 and an outer socket 17. The nipple 16 has an insert portion 18 that is inserted into the end of the hose 10, and the socket 17 is positioned coaxially with the insert portion 18 and around the end of the hose 10. The socket 17, in the example illustrated in the drawings, is deformed radially inwardly as by a crimping or swaging operation, and an internal flange 19 of the socket 17 extends into a radial groove 20 of the nipple 16 in order to secure the socket 17 to the nipple. The portion of the hose 10 between the socket and the nipple is tightly compressed between these parts in order to secure the hose 10 to the fitting 11 and also to form a fluid tight seal between the liner 12 and the outer surface of the tubular insert portion 18.

The apparatus of FIG. 1 further includes a fireguard 26 in accordance with the present invention, the fireguard comprising a tubular layer 27 of an insulating material and an outer cover or shroud 28 that surrounds the insulating layer 27. The insulating layer 27 may be comprised of a silicone compound preferably polysiloxane, and a type of reinforcement 29 may be embedded in the layer 27. The reinforcement 29 may be a braided, woven or plied binder, for example. The outer shroud or cover 28 is preferably flexible metal tubing. A preferred construction comprises a spirally wound strip, the adjacent edges of each turn of the strip being interlocked with the next adjacent turns but the adjacent turns being somewhat movable relative to each other. Thus the hose 10, with the fireguard 26 thereon, may be bent when desired.

It is preferred that the fireguard be provided with means to secure the layer 27 to the fitting and to further protect the hose and fitting assembly in the area where the fitting is secured to the hose 10. Such means comprises an additional tubular layer 31 which is positioned around the portion of the fireguard 26 which surrounds the socket 17. To secure the fireguard 26 and the layer 31 to the fitting 11, a sleeve or collar 32 is positioned over the layer 31 and is secured to it by suitable means. In the present example, the inner diameter of the collar 32 is initially greater than the outer diameter of the layer 31, and the collar 32 is secured to the other parts of the assembly as by a crimping or swaging process which reduces the diameter of the sleeve to the dimensions shown in FIG. 2, where the collar 32 tightly compresses the layer 31 and holds it and the fireguard 26 on the fitting.

The layer 27 and the shroud 28 may be separately formed and the shroud slipped over the layer 27 prior to assembly of the fireguard with the hose, or the layer 27 may be molded to the shroud to form a one-piece construction. The specific example disclosed herein is the former construction. In FIG. 1, the shroud 28 has been mounted on the layer 27 as by pushing and screwing the shroud on. While the shroud 28 is shown as stopping short of the end of the layer 27, the ends of the shroud and layer may be substantially flush. To protect the connection between the hose and the fitting, the layer 27 preferably extends over the fitting and it is secured to the fitting. FIG. 1 shows an initial step in the assembly of the fireguard 26 with the hose 10. The guard 26 is moved toward the left as seen in FIG. 1 and in the fully assembled position, the forward end 33 of the layer 27 is generally aligned with the forward end of the socket 17 (see FIG. 2). The layer 31 and the collar 32 are positioned over the end of the guard and over the socket 17. With reference to FIGS. 1 and 2, an internal recess 34 may be formed in the collar 32 around the exposed end of portion 37 of the layer 27, although this is not necessary, and the layer 31 is compressed into the recess 34 when the collar 32 is deformed inwardly. At the other end of the collar 32, a slanted and internally recessed portion 36 may be provided to reduce the stress on the guard and on the hose when these parts are bent relative to the collar 32. Annular teeth 38 may also be provided on the interior of the collar to improve the connection with the layer 31.

In normal temperature environments, the hose and fitting assembly performs like any other such assembly. If the structure shown in FIG. 2 is exposed to heat, the layers 27 and 31 form heat insulation layers which protect the hose 10. If the ambient temperature becomes quite high, as during a fire, the silicone compound comprising the layers 27 and 31 decomposes and forms silica ash if the heat persists for more than a few minutes. With reference to FIG. 3, the ash is indicated by the reference numeral 41 and it has a flakey dust-like composition. The silicone compound expands somewhat as it decomposed and it may be extruded between the adjacent coils of the shroud 28 as indicated by the reference numeral 42 in FIG. 3, but the main portion of the layer 27 is held in place by the shroud 28 and, where one is provided, by the reinforcement-binder 29. Further, the collar 32 serves to hold the layer 31 and the exposed forward end portion 37 of the layer 27 in place although a portion of the silicone may be extruded from both ends of the collar 32 as indicated at 43.

The above-mentioned ash forms an excellent heat insulator which continues to protect the hose 10 for an extended period of time, in spite of the continued presence of the high temperature. Due to this heat protection by the fireguard, the hose 10 is capable of holding a high pressure fluid, and the connection between the hose and the fitting 11 remains intact. Consequently, the hose assembly continues to be operable and it performs its functions in spite of a high temperature condition such as the presence of a fire.

The layer 27 is made of a silicone compound which will decompose to a silica ash in the presence of high heat as described. A preferred silicone compound is polysiloxane which is presently on the market and used as a fireguard for hose but, of course, without a shroud and without a protector for a fitting as described herein. A specific example of a silicone compound suitable for practising the invention is heat cured dimethylsiloxane elastomeric polymer reinforced with silica fillers, but of course the invention is not restricted to the use of this specific example. d

We claim:

1. A fireguard for a hose and fitting assembly, the assembly including at least one fitting attached to an end of the hose, the fitting including an inner nipple and an outer socket, said fireguard comprising a tubular layer of a silicone compound having an internal diameter adapted to fit around a hose and fitting assembly to be protected, a tubular metal shroud substantially covering said tubular layer, a collar positioned around said shroud and said layer adjacent said fitting, and an additional outer layer of a silicone compound between said collar and the outside of said shroud and said tubular layer, said collar being adapted to secure said fireguard to said fitting.

2. A fireguard as in claim 1, wherein said silicone compound comprises polysiloxane.

3. A fireguard as in claim 1 wherein said shroud comprises a flexible metal tube.

4. An apparatus comprising a hose, at least one fitting fastened to an end of the hose, said fitting including an inner tubular nipple and a socket that extends around said hose, a flexible metal tube over said hose and at least partially over said fitting, a layer of silicone compound between said flexible metal tube and said hose, an outer layer of silicone compound around said metal tube and said first-mentioned layer, and an outer collar around said outer layer and securing said layers and said metal tube to said fitting.

5. An apparatus as in claim 4, wherein said layer and said flexible metal tube extend at least partially over said fitting, and further including means securing said layer and said flexible metal tube to said fitting.

* * * * *